(12) United States Patent
Tailliet

(10) Patent No.: US 8,509,318 B2
(45) Date of Patent: Aug. 13, 2013

(54) MULTIPLE-CHANNEL TRANSMISSION OVER A SINGLE-WIRE BUS

(75) Inventor: François Tailliet, Fuveau (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 87 days.

(21) Appl. No.: 13/055,070

(22) PCT Filed: Jul. 16, 2009

(86) PCT No.: PCT/FR2009/051418
§ 371 (c)(1),
(2), (4) Date: Feb. 17, 2011

(87) PCT Pub. No.: WO2010/010278
PCT Pub. Date: Jan. 28, 2010

(65) Prior Publication Data
US 2011/0150065 A1 Jun. 23, 2011

(30) Foreign Application Priority Data

Jul. 22, 2008 (FR) ..................................... 08 54983

(51) Int. Cl.
*H04B 3/00* (2006.01)
(52) U.S. Cl.
USPC ........... 375/257; 332/115; 375/353; 329/312; 327/26; 327/31; 327/36; 320/145
(58) Field of Classification Search
None
See application file for complete search history.

(56) References Cited

U.S. PATENT DOCUMENTS

| | | | |
|---|---|---|---|
| 4,663,499 A | 5/1987 | Duval | |
| 4,907,222 A * | 3/1990 | Slavik | 370/443 |
| 5,903,607 A | 5/1999 | Tailliet | |
| 7,228,482 B2 * | 6/2007 | Nakajima et al. | 714/750 |
| 2004/0189502 A1 | 9/2004 | Lee | |

FOREIGN PATENT DOCUMENTS

JP 62 222730 A 9/1987

OTHER PUBLICATIONS

English translation of the Written Opinion of the International Searching Authority dated Mar. 10, 2011.

* cited by examiner

*Primary Examiner* — Adolf Dsouza
(74) *Attorney, Agent, or Firm* — Wolf, Greenfield & Sacks, P.C.

(57) ABSTRACT

Apparatus and methods are described that enable concurrent transmission of multiple data signals including clock, synchronization, and power over a single-wire bus between a master device and one or more slave devices. A first transmission channel from the master device to the slave device may modulate the width of periodic pulses between a first voltage level and a second voltage level with respect to a reference potential. A second transmission channel may modulate the amplitude of at least one of the first and second voltage levels to at least one third voltage level. Concurrent communications between a master device and one or more slave devices over a single-wire bus can be achieved.

31 Claims, 3 Drawing Sheets

MULTIPLE-CHANNEL TRANSMISSION OVER A SINGLE-WIRE BUS

CROSS REFERENCE TO RELATED APPLICATIONS

This application is a U.S. National Stage patent application based on PCT Application Number PCT/FR2009/051418, filed on Jun. 16, 2009, entitled "Multichannel Transmission on Unifilar Bus", which application claims the priority benefit of French patent application number 08/54983, filed on Jul. 22, 2008, entitled "Multichannel Transmission on Unifilar Bus," which applications are hereby incorporated by reference to the maximum extent allowable by law.

BACKGROUND OF THE INVENTION

1. Field of the Invention

The present invention generally relates to data transmissions between two electronic circuits. The present invention more specifically relates to the simultaneous transmission, over the same wire, of a power supply, clock, and data signal between a master circuit and one or several slave circuits.

2. Discussion of the Related Art

Communication protocols between a master circuit and a slave circuit which transmit, over the same wire, a power supply, synchronization, and data signal, are generally called single-wire protocols. Most often, the master and slave circuits further have a common voltage reference (typically the ground).

U.S. Pat. No. 5,903,607 describes a system of transmission over a single-wire bus in bidirectional mode.

FIG. 1 is a simplified block diagram of such a transmission system.

FIGS. 2A, 2B, and 2C are timing diagrams illustrating the operation of the system of FIG. 1.

A master electronic circuit 1 (MD) is connected, by a single-wire bus B, to slave circuit 3 (SD). Circuits 1 and 3 further share the same ground or more generally the same reference potential (GND). Circuit 1 (for example a processing circuit of microprocessor type) is supplied with a voltage Vcc, which is, for example, positive with respect to the ground. Circuit 3 (for example, a memory or another processing circuit) is generally not autonomously powered and draws its power supply from the transmission over the communication bus. To make the presence of a common voltage reference clearer, bus B, although considered as a single-wire bus, has been shown in the drawings as including a ground wire 4 in addition to a wire 2 over which power supply, clock, and data signal S transits. The connection to ground 4 may be functional by the rest of the elements of the circuit or of the device.

Master circuit 1 comprises output and input interfaces illustrated in FIG. 1 respectively by output and input terminals OUT and IN connected to wire S. Slave circuit 3 also comprises input and output interfaces illustrated by input and output terminals IN and OUT.

FIGS. 2A to 2C are timing diagrams illustrating a data transmission in a bidirectional mode between master circuit 1 and slave circuit 3.

FIG. 2A illustrates an example of the shape of signal SM imposed by master circuit 1. FIG. 2B illustrates the shape of a signal SS imposed by slave circuit 3 to transmit data in return. FIG. 2C illustrates the shape of resulting signal S on the bus. Signal S corresponds to the signal present on terminals IN of circuits 1 and 3. For simplification, signals SM and SS have been schematized as respectively originating from the transmission circuits of master circuit 1 and of slave circuit 3 and it is considered that the reception circuits connected to terminals IN only see the level of signal S.

Master circuit 1 modulates signal SM in amplitude between two levels V1 and V0, for example, both positive, according to a predefined coding. In fact, circuit 1 modulates at the rate of a clock the pulse widths at level V1 according to the state of the bit to be transmitted. The slave circuit draws its power supply from a filtering at the level of signal S. The quiescent level of signal S for example is level V1. In the shown example, a transmission is initialized by a start bit START in which signal SM is positioned (time t1) at a level V0 while its quiescent level is level V1. This initializes slave circuit 3 and prepares it to receive data and to transmit data in return. Master circuit 1 modulates the level of signal SM at the rate of a clock signal which sets the transmission rate and which enables the slave circuit to extract a clock for sequencing its operation and for synchronizing the transmission with the master circuit. The transmission of a bit at state 0 occurs, for example, with a pulse of level V1 of a duration shorter than the half-period of the clock signal (for example, ¼ of the period) while a state 1 is coded with a pulse of level V1 of a duration longer than the half-period of the clock signal (for example, ¾ of the period). Slave circuit 3 detects the amplitude variation and the corresponding duration of the high and low pulses to determine the value of the transmitted bits. In the direction from slave circuit 3 to master circuit 1 FIG. 2B), the slave circuit modifies the load that it imposes on wire S according to the state of the bit that it wishes to transmit. In the example of FIG. 2B, the slave circuit does not modify the load to transmit a 1 (times t2 and t3). To transmit a 0 (times t4 and t5), it pulls (times t4 and t5) signal SS to the low level, which results in decreasing the duration of the pulse of signal S. This amounts, for the slave circuit, to modulating the width of the pulses of level V1 of signal S according to the state of the bit to be transmitted. The master circuit monitors the level of signal S and, if the level that it has transmitted has not been modified, considers a response by a state 1, while when it detects a modification in the duration of the pulse with respect to the one that it transmits, it considers the reception of a state 0.

A single-wire protocol such as discussed in relation with the above drawings has a rate limited by the period of the clock signal imposed by the master circuit. Further, the master circuit can only transmit a single signal to slave circuits.

SUMMARY OF THE INVENTION

It would be desirable to have a master-slave communication protocol in which a same master circuit can simultaneously communicate with several slave circuits by transmitting different data thereto.

It would also be desirable to increase the transmission rate of a single-wire protocol without requiring an increase in the clock frequency.

To achieve all or part of these objects as well as others, at least one embodiment of the present invention provides a method for transmitting a signal at least of synchronization and data over a single-wire bus between a master device and at least one slave device, wherein:

a first transmission channel from the master device to the slave device modulates the width of periodic pulses between a first voltage level and a second voltage level of same sign with respect to a reference potential; and a second transmission channel modulates the amplitude of at least one of the voltage levels between this level and at least one third level different from the other two and from the reference potential.

According to an embodiment of the present invention, the third level ranges between the first and second levels.

According to an embodiment of the present invention, the amplitude modulation of the second channel is analog between the first and second levels.

According to an embodiment of the present invention, the amplitude modulation of the second channel is digital between the first and third levels.

According to an embodiment of the present invention, a detection of the first channel is performed by detecting rising or falling edges of the signal.

According to an embodiment of the present invention, a detection of the first channel is performed by measurement of the voltage levels.

According to an embodiment of the present invention, a detection of the second channel is performed by measurement of amplitude levels.

According to an embodiment of the present invention, the signal provides the power supply of the slave device.

According to an embodiment of the present invention, the second channel is used in the master-to-slave direction.

According to an embodiment of the present invention, the second channel is used in the slave-to-master direction.

According to an embodiment of the present invention, the slave device modulates the width of said pulses according to the state of data bits to be transmitted in the slave-to-master direction.

An embodiment of the present invention also provides a system of communication according to a single-wire protocol transmitting at the same time a supply level, a synchronization signal, and data over a same wire, comprising means for implementing the method.

An embodiment of the present invention also provides an electronic communication device capable of transmitting data according to this method.

The foregoing objects, features, and advantages of the present invention will be discussed in detail in the following non-limiting description of specific embodiments in connection with the accompanying drawings.

DETAILED DESCRIPTION

Figure 1:
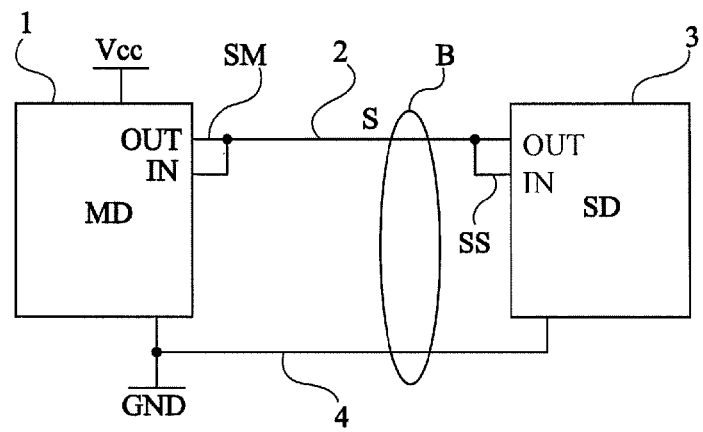
FIG. 1, previously described, is a block diagram of a system of communication between a master circuit and a slave circuit in a single-wire protocol.

The same elements have been designated with the same reference numerals and the timing diagrams have been drawn out of scale.

For clarity, only those steps and elements which are useful to the understanding of the present invention have been shown and will be described. In particular, the generation of the signals on the master device or slave device side has not been detailed, the present invention being compatible with the usual generation of signals in a master-slave protocol exploiting a single-wire connection.

Figure 3:
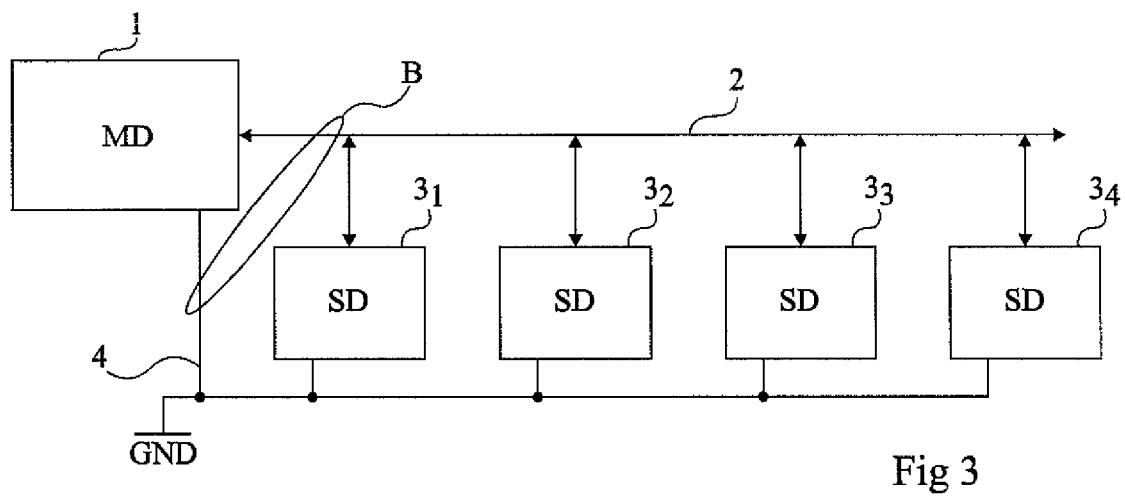
FIG. 3 is a block diagram of an embodiment of a single-wire communication system.

FIG. 3 is a block diagram of an embodiment of a system of communication between a master device 1 (MD) and one or several slave devices $3_1, 3_2, 3_3, 3_4$ (SD) over a bus B formed of a single-wire connection 2 for transmitting a power supply, clock, and data signal and of a common reference wire 4 (for example, ground GND).

Figure 4:
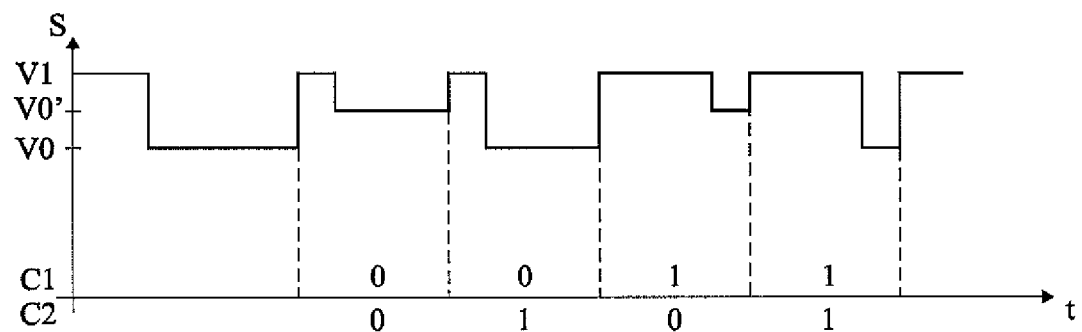
FIG. 4 is a timing diagram illustrating the operation of a multiple-channel single-wire protocol.

FIG. 4 is a timing diagram illustrating the level of signal S according to an embodiment of the system of FIG. 3.

Figure 2A:
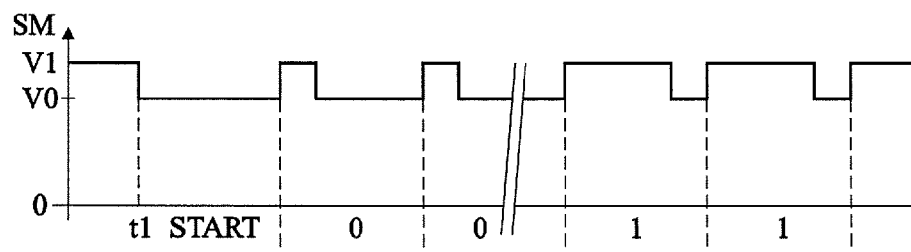
FIGS. 2A, 2B, and 2C, previously described, are timing diagrams illustrating a usual operation of the system of FIG. 1.
Figure 2B:
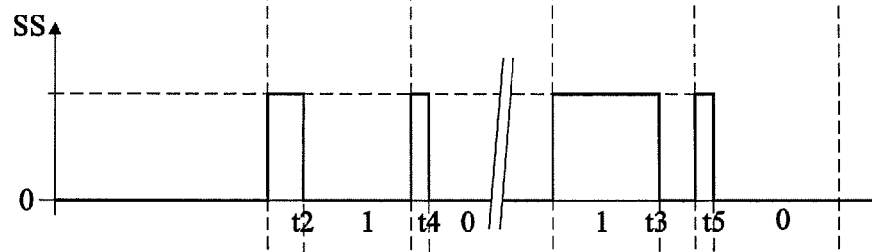
Figure 2C:
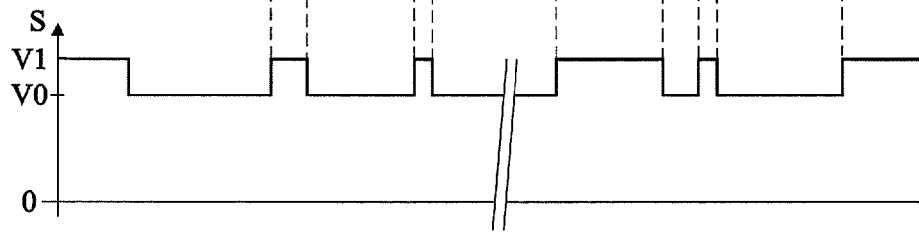

As compared with the protocol described in relation with FIGS. 2A to 2C, an intermediary level V0' between levels V0 and V1 is taken into account by one or several slave circuits. This intermediary level corresponds to a second transmission channel usable by the master circuit towards one or several slave devices.

The exploitation of a first channel C1 s performed as previously by modulation of the width of the pulses of level V0 (or V1) of signal S between two widths according to the state 0 or 1 to be transmitted. The example shown in FIG. 4 assumes the successive transmission of two states 0 followed by two states 1.

In the example of FIG. 4, the exploitation of a second digital channel C2 comprises modulating the low level of this pulse train between level V0 and a level V0' to condition the state of the transmitted bits. For example, this second channel C2 successively transmits a state 0, a state 1, a state 0 and a state 1, assuming that level V0' corresponds to the transmission of a state 0 and level V0 corresponds to the transmission of a state 1.

On the receive side, the detection of channel C1 is performed either by detecting levels V0 and V1, or by detecting the edges of signal S, and by inducing from these detections the duration of the pulse at level V1. The detection of channel C2 is performed by detecting the intermediary voltage level V0' with respect to levels V0 and V1. This means that the detection circuit is capable of discriminating at least one intermediary level between levels V0 and V1.

As a variation, a third channel is used by modulating high level V1 according to the state of the transmitted bits. According to another variation, several intermediary levels are exploited between levels V0 and V1. However, such a variation requires an increased accuracy in the voltage detectors of the receivers.

According to another variation, the second channel transmits analog data. An analog exploitation of the second channel comprises modulating the amplitude of intermediary level V0' between levels V0 and V1 while keeping a margin between the limits of the modulation range and these levels V0 and V1 to avoid adversely affecting the detection of the first channel.

Figure 5:
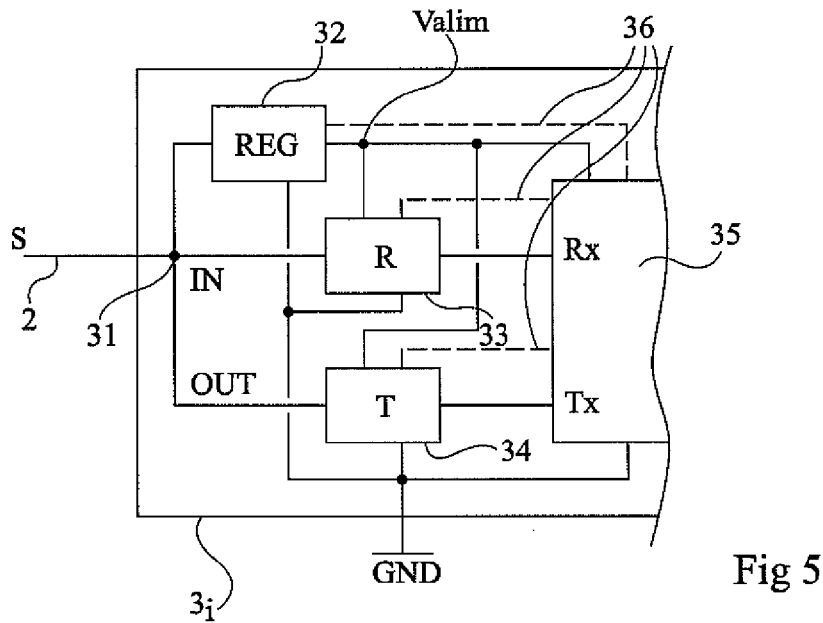
FIG. 5 is a partial block diagram of a slave circuit of the system of FIG. 3.

FIG. 5 is a partial block diagram of an embodiment of a slave circuit 3i. Single-wire connection 2 is connected to a terminal 31 of circuit 3i, shared between an input terminal of a voltage regulator 32 (REG), an input terminal of a reception circuit 33 (R), and an output terminal OUT of a transmit circuit 34 (T). All circuits are powered with a voltage Valim provided by voltage regulator 32 from the signal present on terminal 31. Circuits 33 and 34 communicate with a processing unit 35 while being respectively connected to reception and transmission terminals Rx and Tx. Further, circuits 32, 33, and 34 are controlled by unit 35 (control connection 36 illustrated, in dotted lines). Circuit 33 is assumed to be capable to detect not only levels V0 and V1, but also level V0'.

Preferably, circuit 33 is capable of adapting its detection levels in a training procedure. This enables to take into account possible variations of these levels. For example, this enables a same slave circuit to adapt to different master circuits having different transmitted voltage levels. According to another example, this enables to compensate for possible voltage drifts along time.

Figure 6:
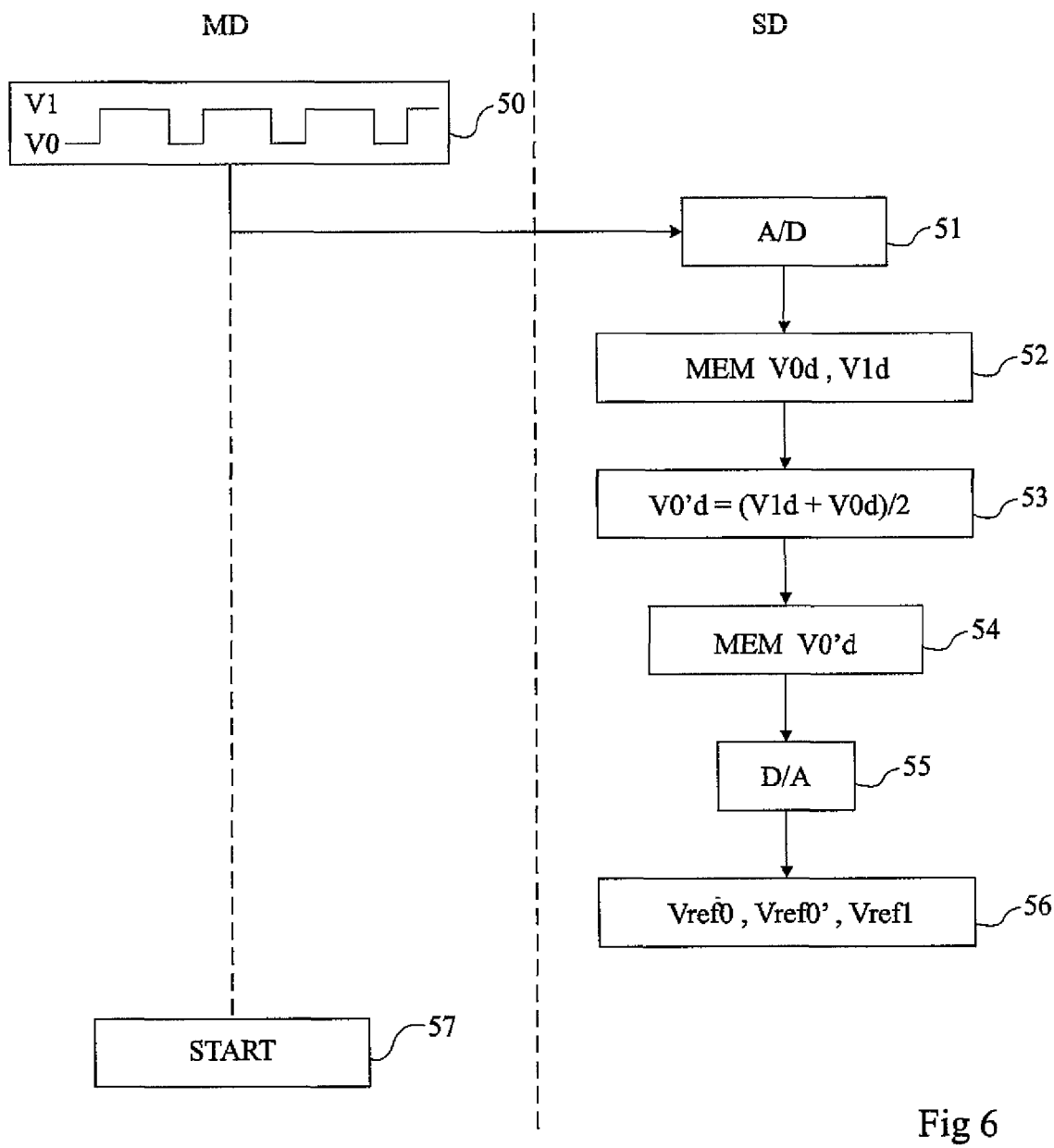
FIG. 6 is a simplified timing diagram illustrating a communication initialization phase.

FIG. 6 is a simplified timing diagram of a procedure of acquisition of the voltage levels to be detected by reception circuit 33 of FIG. 5. In this example, level V0' is assumed to correspond to the average level between levels V0 and V1. Master circuit MD (left-hand portion of FIG. 6) transmits (block 50) a pulse train of a preset sequence between levels V0 and V1. In receive mode on the slave circuit side, the voltage is used on the one hand to provide a supply voltage Valim and a clock signal. Further, the received signal is converted (block 51, A/D) into digital levels. Then, the measured levels, discriminated between high and low levels V0$d$ and V1$d$, are stored (block 52, MEM). Average value V0'$d$ between the two levels V0'$d$=(V1$d$+V0$d$)/2 is then calculated in a block 53 to store intermediary level V0'$d$ (block 54, MEM) representing the second channel. The set of levels is then converted into analog reference signals (block 55—digital-to-analog conversion D/A). Finally, the obtained analog levels Vref0, Vref0', and Vref1 (block 56) are exploited by comparators (not shown) of the reception circuit (33, FIG. 5) to determine the level of the received signal.

Once this acquisition phase has been performed, the master device can start a transmission (block 57, START).

Figure 7:
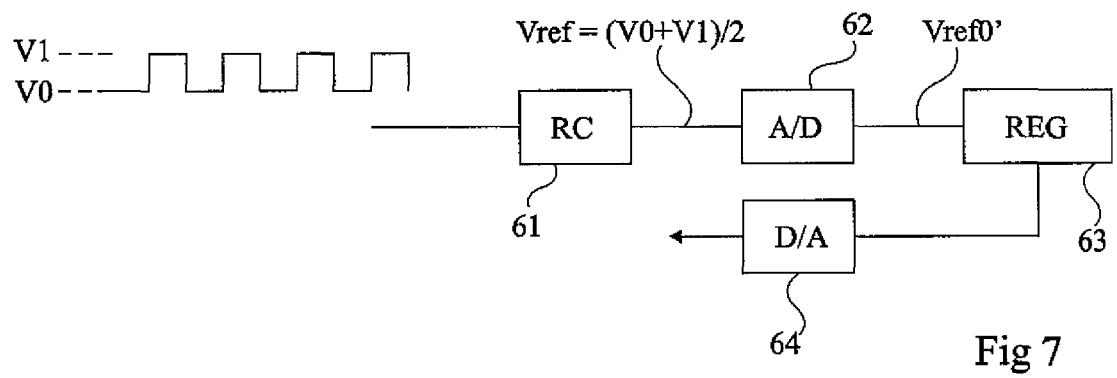
FIG. 7 is a block diagram of a detail of the structure of a reception circuit on the slave device side.

FIG. 7 illustrates an alternative embodiment according to which the pulse train provided by the master device in an acquisition phase is a square signal between amplitudes V0 and V1. This signal may be processed by an averager (block 61 formed for example of a resistive and capacitive circuit RC) which provides a reference level Vref=(V0+V1)/2. This reference level is provided to an analog-to-digital converter (block 62, A/D) to generate a reference value Vref0' stored (block 63, REG) for example in a register. The value contained in the register is then exploited after conversion into an analog signal (block 64, D/A) to provide an analog comparison signal.

The reference levels used to discriminate the received states are exploited by the reception circuit as a usual level detector with or without hysteresis. According to a variation more specifically intended for applications in which levels V0, V0', and V1 are determined and steady, the reference levels of the comparators of the reception circuit for example correspond to stored digital levels or to analog levels set, for example, by one or several resistive bridges based on the supply voltage.

Other training frames may be provided, especially to set other intermediary levels.

It may also be provided for the slave device to detect the 0 or 1 transmitted over the first channel by an edge detection. For an edge detection, it may be provided to detect the rising and falling edges present on the bus by means of comparators and of logic gates. Such a detection does not enable discriminating a second possible channel. Accordingly, a slave device only equipped with an edge detector will only be able to detect the data transmitted over the first channel.

The use of a second channel does not adversely affect the bidirectional character of the transmission. It remains possible for one of the slave circuits or for several of them to transmit in return, in usual fashion, by decreasing or not the width of the pulses at level V1 according to the state to be transmitted.

Different applications are possible by exploiting the above-described communication protocol.

According to a first example, the use of this second channel enables doubling the communication rate.

According to another example, this second channel may be used to transmit encrypted data.

According to still another example, slave devices compatible with various applications may identify which application is used by examining the voltage levels present on the bus.

According to still another example, the transmission may be simultaneously intended for different slave devices, each of them exploiting one of the transmitted channels.

The adaptation of the reference levels by the slave devices enables to use a master circuit to communicate with slave circuits sized to operate under different voltages.

Further, a modification in levels V0 and V1 by the master circuit may be used to revoke a slave circuit (for example, a slave circuit dedicated to an operation under given levels V0 and V1) without using the communication channel.

According to an alternative embodiment, the second channel is used for a transmission in the slave-to-master direction. This enables a full-duplex communication, where the slave can send one bit to the master each time is receives one bit from it. The slave device should for this purpose be able (like the master) to modulate the signal level with the intermediary level(s). It may for example be provided for the slave device to impose its own levels that the master device detects in a training phase similar to that described hereinabove for the detection by the slave device of the levels transmitted by the master device. According to another example, the levels remain set by the master device and the slave device stores these levels in a training sequence to use them afterwards as a reference.

A communication system exploiting the described multiple-channel protocol translates, over the single-wire connection, as a variation of the voltage level between at least three values during the communication.

Various embodiments have been described. Various modifications are within the abilities of those skilled in the art. In particular, the practical implementation of the present invention based on the functional indications given hereabove is within the abilities of those skilled in the art. Further, reference has been made to terms master and slave device/circuit to designate any communicating element. These may be circuits of a same apparatus, different apparatuses, and a same device or slave circuit may, according to applications, exploit one or several of the transmitted channels. Further, although the present invention has been more specifically described in relation with a slave device drawing its power supply from the transmission bus, the described multiple-channel protocol also applies to slave circuits supplied independently from the bus (for example, by being connected to a specific bus for providing a supply voltage of a device integrating the master and slave circuits, or by being powered by a battery or the like).

According to a specific embodiment, the communication bus is used between a printer (master device 1) and its ink cartridge(s) (slave devices $3_1$, $3_2$, $3_3$, and $3_4$).

Such alterations, modifications, and improvements are intended to be part of this disclosure, and are intended to be within the spirit and scope of the invention. Accordingly, the foregoing description is by way of example only and is not intended as limiting. The present invention is limited only as defined in the following claims and the equivalents thereto.

What is claimed is:

1. A method for transmitting a combined signal at least of a synchronization signal and a plurality of data signals over a single-wire bus between a master device and at least one slave device, wherein:
   a first data transmission channel from the master device to a first slave device modulates a width of periodic pulses between a first voltage level and a second voltage level with respect to a reference potential; and
   a second data transmission channel modulates an amplitude of at least one of the first or second voltage levels between their respective voltage level and at least one third voltage level different from the first and second voltage levels and from the reference potential in the combined signal, wherein the first and second data transmission channels carry information other than clock and synchronization information.

2. The method of claim 1, wherein the third voltage level ranges between the first and second voltage levels.

3. The method of claim 1, wherein the amplitude modulation of the second channel is analog between the first and second levels.

4. The method of claim 1, wherein the amplitude modulation of the second channel is digital between the first or second voltage levels and third voltage level.

5. The method of claim 1, wherein a detection of the first channel is performed by detecting rising or falling edges of the combined signal.

6. The method of claim 1, wherein a detection of the first channel is performed by measurement of the voltage levels.

7. The method of claim 1, wherein a detection of the second channel is performed by measurement of amplitude levels.

8. The method of claim 1, wherein the combined signal further provides a supply of power for the at least one slave device.

9. The method of claim 1, wherein the second channel is used in the master-to-slave direction.

10. The method of claim 1, wherein the second channel is used in the slave-to-master direction.

11. The method of claim 1, wherein a slave device modulates the width of said pulses according to a state of data bits to be transmitted in the slave-to-master direction.

12. A system of communication according to a single-wire protocol transmitting at the same time a supply level, a synchronization signal, and data over a same wire, comprising means for implementing the method of claim 1.

13. An electronic communication device capable of transmitting data according to the method of claim 1.

14. The method of claim 1, wherein the first voltage level and second voltage level are of a same polarity.

15. The method of claim 1, wherein a third data transmission channel modulates an amplitude of at least one of the first or second voltage levels between their respective voltage level and at least one forth voltage level different from the first, second, and third voltage levels and from the reference potential in the combined signal.

16. The method of claim 1, wherein the first and second data transmission channels carry information simultaneously.

17. A method of communicating with one or more devices over a single-wire bus, the method comprising:
   generating, by a first device, a base signal having periodic pulses;
   encoding, by the first device, a first data communication signal onto the base signal by modulating a width of the periodic pulses between a first voltage level and a second voltage level with respect to a reference potential;
   encoding, by the first device, a second data communication signal onto the base signal by modulating an amplitude of at least one of the first or second voltage levels between their respective voltage level and at least one third voltage level different from the first and second voltage levels and from the reference potential, wherein the first and second data communication signals carry information other than clock and synchronization information; and
   providing the base signal and first and second data communication signals to the single-wire bus.

18. The method of claim 17, wherein the base signal provides power to at least one of the one or more devices.

19. The method of claim 17, wherein the base signal provides a clock and/or synchronization signal to at least one of the one or more devices.

20. The method of claim 17, wherein the first and second data communication signals are encoded onto the single-wire bus simultaneously.

21. The method of claim 17, further comprising receiving, by the first device, over the single-wire bus a third data communication signal from one of the one or more devices, wherein the third data communication signal is received simultaneously with transmission of at least one of the first and second data communication signals.

22. The method of claim 21, wherein the third data communication signal comprises a modulation of an amplitude of at least one of the first or second voltage levels between their respective voltage level and at least one forth voltage level different from the first, second, and third voltage levels.

23. The method of claim 21, further comprising decoding, by the third device, the third data communication signal by measurement of voltage levels of a combined signal on the single-wire bus.

24. The method of claim 17, wherein the first device is a master device and the one or more devices are slave devices.

25. A first device adapted to communicate with one or more electronic devices over a single-wire bus, the first device comprising a processor and data communication apparatus configured to:
   generate a base signal having periodic pulses;
   encode a first data communication signal onto the base signal by modulating a width of the periodic pulses between a first voltage level and a second voltage level with respect to a reference potential;
   encode a second data communication signal onto the base signal by modulating an amplitude of at least one of the first or second voltage levels between their respective voltage level and at least one third voltage level different from the first and second voltage levels and from the reference potential, wherein the first and second data communication signals carry information other than clock and synchronization information; and
   provide the base signal and first and second data communication signals to the single-wire bus.

26. The first device of claim 25, wherein the base signal provides power to at least one of the one or more electronic devices.

27. The first device of claim 25, wherein the base signal provides a clock and/or synchronization signal to at least one of the one or more electronic devices.

28. The first device of claim 25, wherein the first and second data communication signals are encoded onto the single-wire bus simultaneously.

29. The first device of claim 25, wherein the processor and data communication apparatus are further configured to receive over the single-wire bus a third data communication signal from one of the one or more electronic devices, wherein the third data communication signal is received simultaneously with transmission of at least one of the first and second data communication signals.

30. The first device of claim 29, wherein the processor and data communication apparatus are further configured to decoding, by the third device, the third data communication signal by measurement of voltage levels of a combined signal on the single-wire bus.

31. The first device of claim 25, wherein the first device is a master device and the one or more electronic devices are slave devices.

* * * * *